(12) United States Patent
Cuttner

(10) Patent No.: US 8,114,579 B2
(45) Date of Patent: *Feb. 14, 2012

(54) MANUFACTURING DATA-STORAGE MEDIA USING LIGHT-CURABLE MATERIAL

(75) Inventor: Craig D. Cuttner, Norwalk, CT (US)

(73) Assignee: Home Box Office, Inc., New York, NY (US)

( * ) Notice: Subject to any disclaimer, the term of this patent is extended or adjusted under 35 U.S.C. 154(b) by 67 days.

This patent is subject to a terminal disclaimer.

(21) Appl. No.: 12/577,354

(22) Filed: Oct. 12, 2009

(65) Prior Publication Data

US 2010/0028627 A1 Feb. 4, 2010

Related U.S. Application Data

(63) Continuation of application No. 11/247,478, filed on Oct. 11, 2005, now Pat. No. 7,622,245.

(51) Int. Cl.
*G03C 5/56* (2006.01)

(52) U.S. Cl. ......... 430/321; 430/320; 430/945; 430/394

(58) Field of Classification Search .................. None
See application file for complete search history.

(56) References Cited

U.S. PATENT DOCUMENTS

| | | | |
|---|---|---|---|
| 5,114,531 A | | 5/1992 | Fukushima et al. |
| 5,138,604 A | | 8/1992 | Umeda et al. |
| 5,264,327 A | | 11/1993 | Kamio |
| 5,402,411 A | | 3/1995 | Maeda et al. |
| 5,447,767 A | | 9/1995 | Tanabe et al. |
| 5,843,626 A | * | 12/1998 | Ohta et al. ............... 430/320 |
| 7,622,245 B2 | * | 11/2009 | Cuttner ................. 430/321 |
| 2004/0170117 A1 | * | 9/2004 | Edwards et al. ............ 369/275.4 |
| 2005/0148106 A1 | | 7/2005 | Iwafuchi et al. |
| 2005/0153109 A1 | | 7/2005 | Drew et al. |

FOREIGN PATENT DOCUMENTS

| | | |
|---|---|---|
| JP | 62-110636 A | 5/1987 |
| JP | 01-182942 A | 7/1989 |
| JP | 01-235693 A | 9/1989 |
| JP | 04-026940 A | 1/1992 |
| JP | 04-069296 A | 3/1992 |
| JP | 04-087036 A | 3/1992 |
| JP | 08-235647 * | 9/1996 |

OTHER PUBLICATIONS

Non-Final Office Action; Mailed on Dec. 5, 2008 for corresponding U.S. Appl. No. 11/247,478, filed Oct. 11, 2005.
Final Rejection; Mailed on Jun. 10, 2009 for corresponding U.S. Appl. No. 11/247,478 filed Oct. 11, 2005.
Notice of Allowance and Fee(s) Due; Mailed on Sep. 3, 2009 for corresponding U.S. Appl. No. 11/247,478 filed Oct. 11, 2005.

* cited by examiner

*Primary Examiner* — Martin Angebranndt
(74) *Attorney, Agent, or Firm* — Mendelsohn, Drucker & Associates, P.C.; Edward J. Meisarosh; Steve Mendelsohn

(57) ABSTRACT

Instances of data-storage media having pits and lands, such as individual DVDs or CDs, are manufactured by selectively illuminating a light-curable material to form cured regions corresponding to the lands. The selective illumination of the light-curable material can be implemented using mask-based illumination or selective laser illumination or both. The mask used in mask-based illumination can have one or more extra opaque portions and/or one or more extra transparent portions corresponding to false pits and/or false lands, respectively, where selective laser illumination is used to convert one or more false pits/lands produced during mask-based illumination into true pits/lands for the competed medium.

6 Claims, 7 Drawing Sheets

MANUFACTURING DATA-STORAGE MEDIA USING LIGHT-CURABLE MATERIAL

This application is a continuation of U.S. patent application Ser. No. 11/247,478, filed on Oct. 11, 2005, incorporated herein by reference in its entirety.

BACKGROUND OF THE INVENTION

1. Field of the Invention

The present invention relates to techniques for manufacturing data-storage media, such as compact discs (CDs) and digital video discs (DVDs).

2. Description of the Related Art

A conventional DVD player reads digital data stored on a DVD by illuminating the DVD with light from a laser and detecting and processing light reflected from different portions of the DVD (e.g., by rotating the DVD and moving the illuminating laser light radially). Portions of the DVD that store instances of the logical data value "1" have optical characteristics that are different from the optical characteristics of portions of the DVD that store instances of the logical data value "0", such that the reflected laser light is different for logical "1"s and "0"s.

There are different ways to manufacture a DVD, including stamping and burning.

FIG. 1 shows a schematic cross-section of a portion of a conventional stamped DVD 100. Stamped DVD 100 comprises a plastic (e.g., polycarbonate) substrate 102 and a protective layer 106 with an intervening reflective (e.g., aluminum) coating 104. The interface between substrate 102 and protective layer 106 is defined by physical characteristics referred to as pits 108 and lands 110, which are distinguished by their different elevation levels in the Z direction represented in FIG. 1. As viewed in FIG. 1, lands correspond to plateaus (i.e., regions of relatively elevated elevation) in the topology of the upper surface of substrate 102, while pits corresponds to valleys (i.e., regions of relatively depressed elevation) in that topology. Depending on the DVD storage scheme, transitions between pits 108 and lands 110 may correspond to logical "1"s and "0"s.

According to one prior-art technique, substrate 102 is formed by physically pressing a heat-softened plastic disc (corresponding to substrate 102) against a master disc having "a mirrored image" of the pits and lands of substrate 102 to create pits and lands on the upper surface (as viewed in FIG. 1) of substrate 102. Reflective coating 104 is then applied (e.g., by sputtering or vapor deposition) to the upper surface of substrate 102, followed by application of protective layer 106 to form DVD 100 (e.g., by applying a spun coating of clear enamel). Note that protective layer 106 may also function as the label for stamped DVD 100. Stamped DVDs are typically manufactured in large quantities using sophisticated and expensive machinery.

An alternative to stamping DVDs is burning, where selected portions of a "blank" disc are illuminated with laser light that alters the optical characteristics of the disc material in those selected portions, thereby creating "optical" pits and lands that function analogously to the "topological" pits and land of a stamped DVD. One of the advantages of burning DVDs is that the technique can be implemented using equipment that is less expensive than the conventional machinery used to stamp DVDs. One of the disadvantages is that certain copyright protection schemes, such as the Contents Scramble System (CSS), are designed for stamped DVDs, but not for burnt DVDs.

SUMMARY OF THE INVENTION

In one embodiment, the present invention is a method and apparatus for manufacturing a data-storage medium having pits and lands. A layer of a uncured, light-curable material is applied to a substrate. Selected regions of the layer are illuminated with material-curing light to cure portions of the material corresponding to the selected regions. Uncured portions of the material are removed from the substrate to create lands corresponding to the cured portions, and the manufacturing of the data-storage medium is completed, as appropriate.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 2:
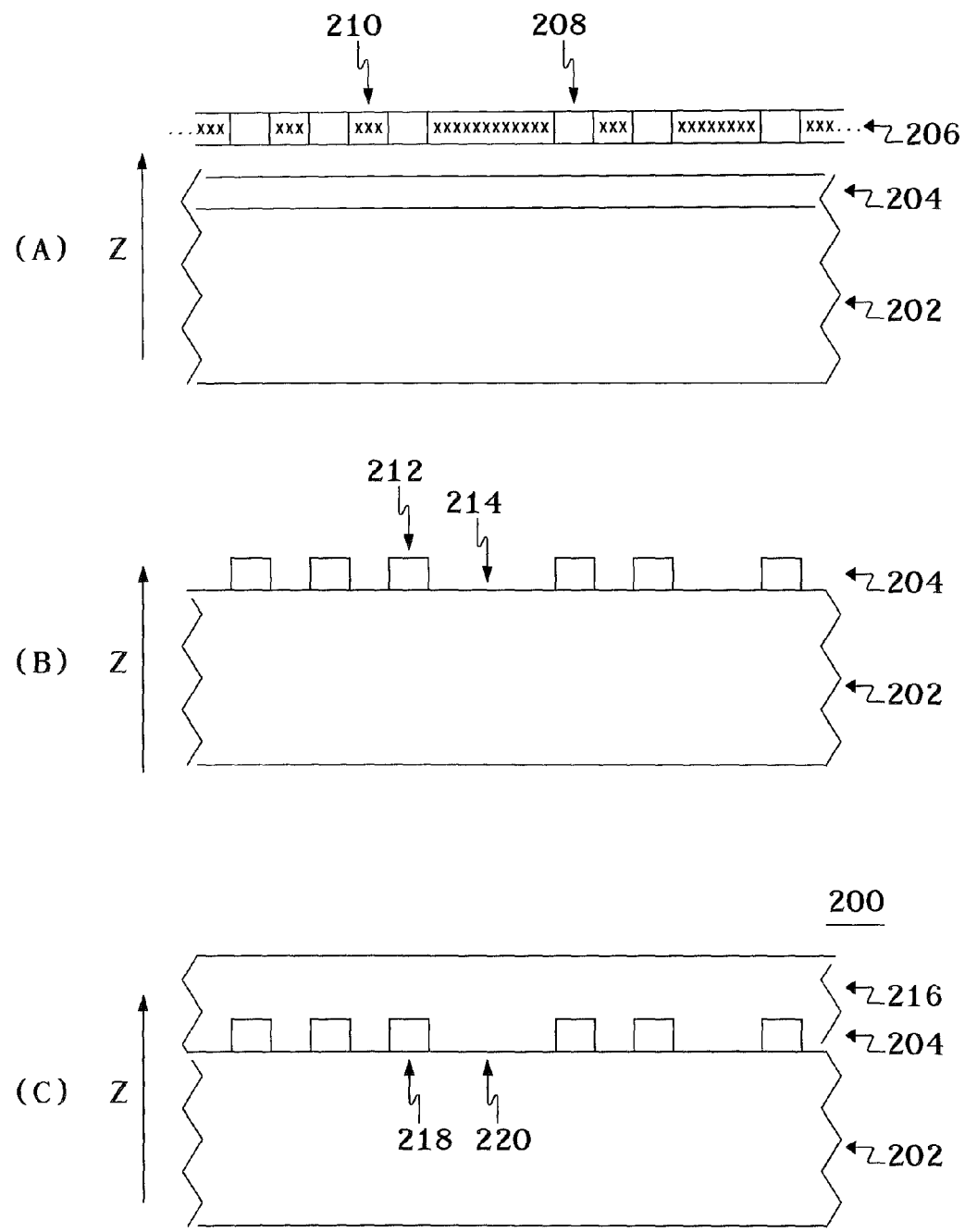
FIGS. 2(A)-(C) represent a technique for manufacturing a DVD, according to one embodiment of the present invention.

FIGS. 2(A)-(C) represent a technique for manufacturing a DVD, according to one embodiment of the present invention. As represented in FIG. 2(A), a layer 204 of uncured (e.g., semi-fluid), light-curable material is applied to the upper (as viewed in FIG. 2) surface of a substrate 202.

Different portions of layer 204 are then selectively illuminated with appropriate (i.e., material-curing) light under appropriate conditions (e.g., temperature, pressure and composition of ambient air, duration and intensity of illumination) to cure (i.e., make solid) the light-curable material corresponding to those different portions. This selective illumination can be accomplished using a variety of methods.

One such method is represented in FIG. 2(A), where an optical mask 206 having appropriate transparent portions 208 and opaque portions 210 is positioned over layer 204 and a broad beam of material-curing light is applied from above to selectively illuminate different portions of layer 204. If substrate 202 is transparent to the material-curing light, then optical mask 206 could alternatively be positioned below substrate 202 with the material-curing light applied from below.

Other methods of selectively illuminating different portions of layer 204 with material-curing light involve the selective application of a relatively narrow beam of laser light, similar to what is done in the prior-art technique of burning DVDs. Here, too, depending on the implementation, the laser light can be applied either from above or from below. Note that the material-curing light can be any electromagnetic radiation suitable for curing the curable material, and can be, but need not be visible light.

No matter which method is employed for selectively illuminating different portions of layer 204, the result is that the light-curable material corresponding to the illuminated portions will be cured, while the light-curable material that was not illuminated will remain in its uncured state. By removing (e.g., washing away) the uncured material from the substrate, the cured material will remain, as represented in FIG. 2(B), as plateaus 212 of cured material separated by valleys 214 (corresponding to the removed uncured material) on the upper surface of substrate 202. An appropriate reflective coating (not shown) can then be applied over the plateaus and valleys, using a conventional sputtering or vacuum deposition technique.

Figure 1:
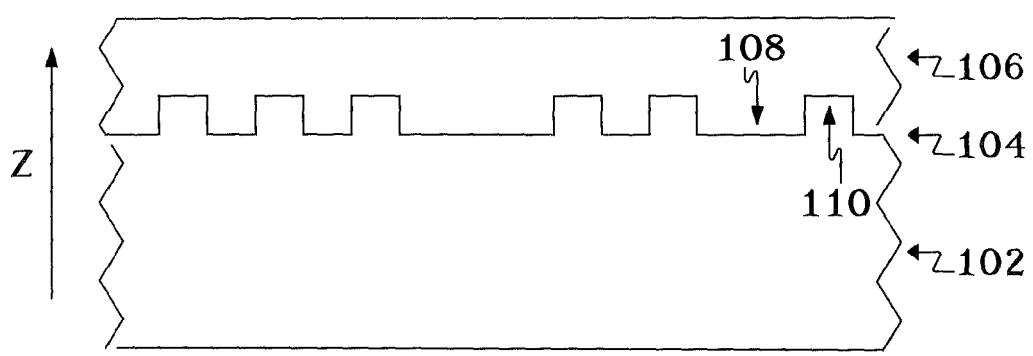
FIG. 1 shows a schematic cross-section of a portion of a conventional stamped DVD.

As represented in FIG. 2(C), the manufacturing process is completed by applying a protective coating 216 to the upper surface to produce a DVD 200 having land structures 218 and pit structures 220 physically and functionally analogous to the lands and pits of prior-art DVD 100 of FIG. 1.

Different suitable materials may be used in manufacturing DVD 200. In one possible implementation, substrate 202 may be a polycarbonate plastic, the light-curable material of layer 204 may be Accura® LaserForm® ST-200 material or DuraForm® polyamide and glass-filled laser-sintering material from 3D Systems Corporation of Valencia, Calif., the reflective coating may be aluminum, and protective coating 216 may be enamel.

Figure 3:
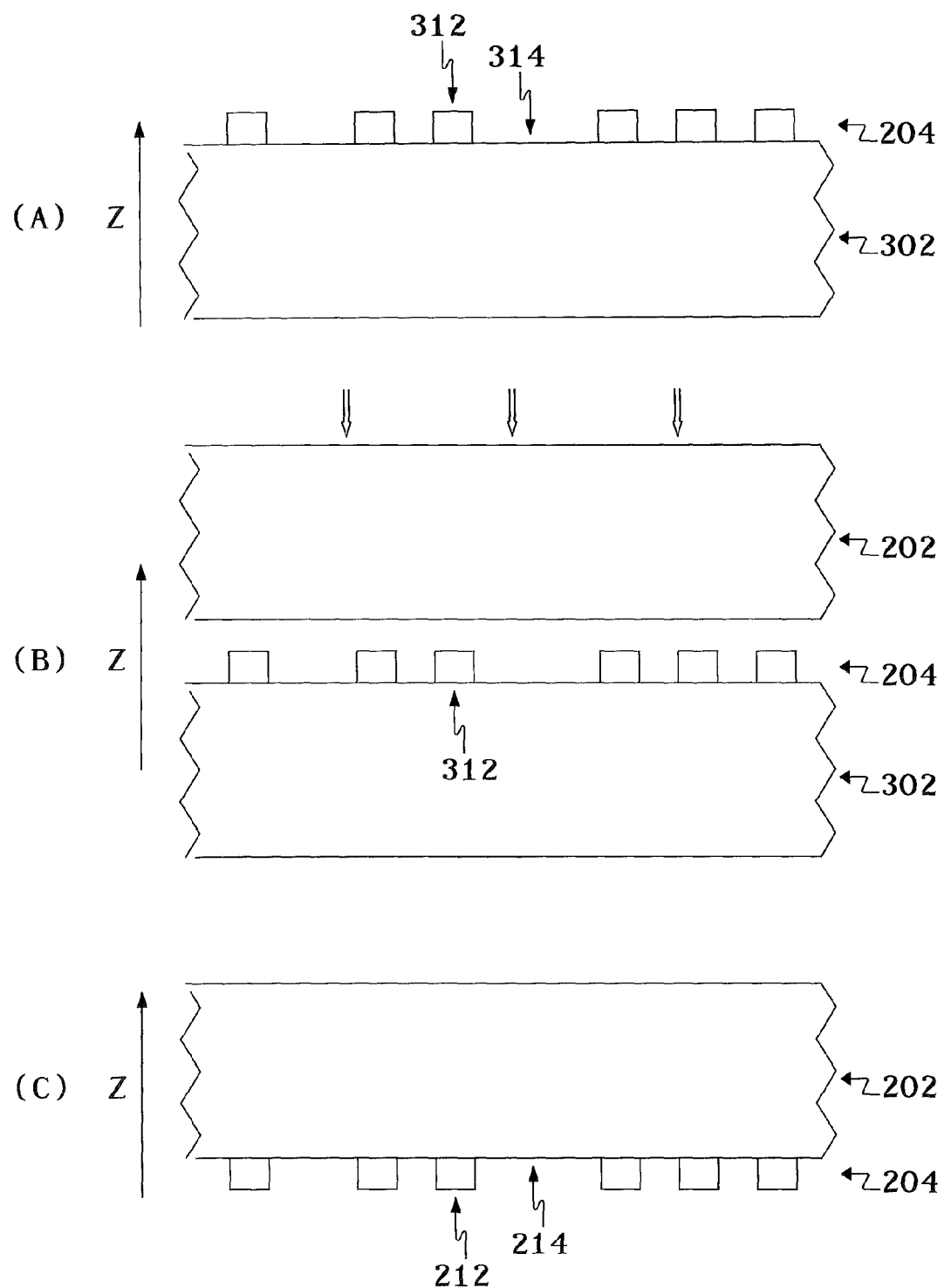
FIGS. 3(A)-(C) represent a technique for manufacturing a DVD, according to another embodiment of the present invention.

FIGS. 3(A)-(C) represent a technique for manufacturing a DVD, according to another embodiment of the present invention. The initial steps of this technique are similar to those for the technique of FIG. 2, except that, as represented in FIG. 3(A), plateaus 312 of cured material and corresponding valleys 314 are formed on a press-machine (e.g., polycarbonate) substrate 302, instead of being formed on substrate 202 of FIG. 2. If press-machine substrate 302 is opaque to the material-curing light, then the material-curing light will be applied from above (as viewed in FIG. 3), using either mask-based illumination or selective laser illumination.

As represented in FIG. 3(B), plateaus 212 of cured material are physically transferred from press-machine substrate 302 to blank substrate 202 by pressing substrate 202 onto the upper surface of press-machine substrate 302 for under suitable conditions (e.g., time, temperature, and physical pressure).

The resulting structure is shown in FIG. 3(C), where the plateaus 212 of cured material and corresponding valleys have been transferred and fused onto the lower surface of substrate 202. The manufacture of a DVD similar to DVD 200 of FIG. 2 can be completed by applying reflective and protective coatings similar to those applied in the technique of FIG. 2.

Note that the structure shown in FIG. 3(C) is identical to the structure shown in FIG. 2(B), albeit flipped over (i.e., rotated 180 degrees about the normal to the page). To achieve this identical structure, the locations of the pits and lands formed press-machine substrate 302 of FIG. 3 should be a mirrored image of the pits and lands formed on substrate 202 of FIG. 2(B). When mask-based illumination is employed, this mirrored image can be achieved by flipping over mask 206 of FIG. 2(A).

Note that the materials used in the technique of FIG. 3 may be, but do not have to be the same as those used in the technique of FIG. 2.

As is the case with the master discs used in the conventional DVD stamping technique, one of the dangers of using optical masks, similar to mask 206 of FIG. 2(A), is the risk of the masks being stolen and used to manufacture unauthorized DVDs containing the content encoded in the mask. One possible solution to this problem is to employ optical masks having one or more extra opaque portions (corresponding to features referred to herein as "false pits") that do not correspond to pits in the completed DVD.

FIGS. 4(A)-(D) represent a technique for manufacturing a DVD employing a mask having one or more opaque portions corresponding to false pits, according to one embodiment of the present invention. As represented in FIG. 4(A), the initial steps of this technique are similar to those for the technique of FIG. 2, except that mask 406 has one or more opaque, false-pit portions 410 corresponding to particular portions of mask 206 of FIG. 2 that are transparent in mask 206.

As a result, as represented in FIG. 4(B), after illuminating layer 204 of light-curable material through mask 406, layer 204 has cured "true-land" regions 401 and uncured "true-pit" regions 403, corresponding to actual lands and pits, respectively, in the completed DVD. In addition, layer 204 has an uncured false-pit region 405 corresponding to each false-pit portion 410 in mask 406.

As represented in FIG. 4(C), prior to removing the uncured material from layer 204, uncured false-pit region 405 of FIG. 4(B) is selectively illuminated using laser light 407 to cure the light-curable material in that region to convert the false-pit region into a cured true-land region 401.

As represented in FIG. 4(D), after the uncured material is removed from layer 204, the resulting structure is identical to the structure represented in FIG. 2(B). The DVD manufacturing process can then be completed as described in reference to FIG. 2.

Another possible solution to the problem of employing optical masks that accurately represent DVD content is to employ optical masks having one or more extra transparent portions (corresponding to features referred to as "false lands") that do not correspond to lands in the completed DVD.

FIGS. 5(A)-(D) represent a technique for manufacturing a DVD employing a mask having one or more transparent portions corresponding to false lands, according to one embodiment of the present invention. As represented in FIG. 5(A), the initial steps of this technique are similar to those for the technique of FIG. 2, except that mask 506 has one or more transparent, false-land portions 508 corresponding to particular portions of mask 206 of FIG. 2 that are opaque in mask 206.

As a result, as represented in FIG. 5(B), after illuminating layer 204 of light-curable material through mask 506, layer 204 has cured true-land regions 501, uncured true-pit regions 503, and an cured false-land region 505 corresponding to each false-land portion 508 in mask 506.

As represented in FIG. 5(C), after the uncured material is removed from layer 204, the structure include a false land 509 for every false-land region 505 in FIG. 5(B). False land 509 is selectively burned off using laser light 507 to convert the false land into a true pit.

As represented in FIG. 5(D), the resulting structure is identical to that represented in FIG. 2(B) and FIG. 4(D). The DVD manufacturing process can then be completed as described in reference to FIG. 2.

Figure 4:
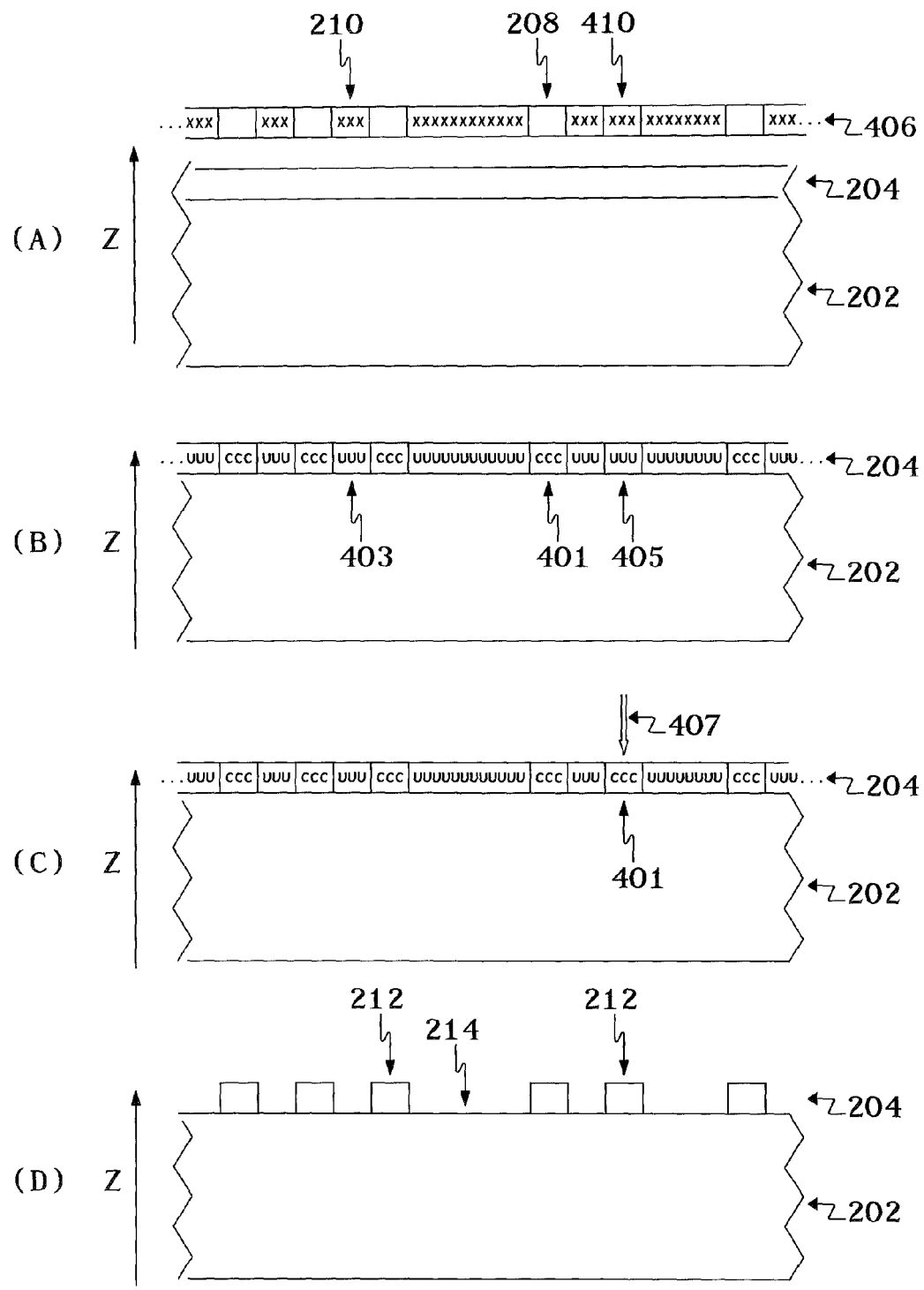
FIGS. 4(A)-(D) represent a technique for manufacturing a DVD employing a mask having one or more opaque portions corresponding to false pits, according to one embodiment of the present invention.
Figure 5:
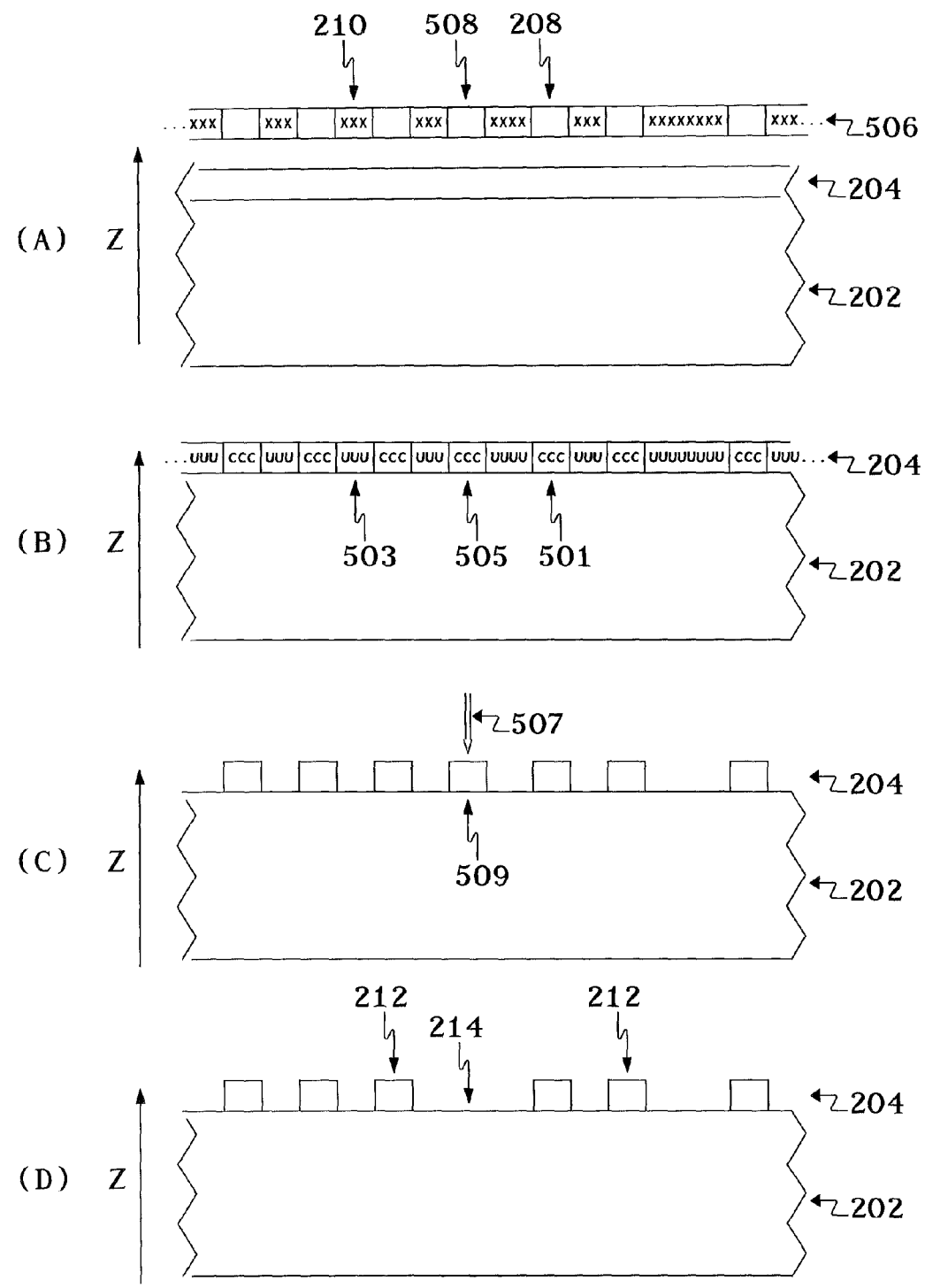
FIGS. 5(A)-(D) represent a technique for manufacturing a DVD employing a mask having one or more transparent portions corresponding to false lands, according to one embodiment of the present invention.

The two-step illumination process (i.e., mask-based illumination followed by selective laser illumination) of either FIG. 4 or FIG. 5 can also be employed to create a structure similar to that shown in FIG. 3(A) employing techniques analogous to the machine-press technique of FIG. 3.

Other embodiments of two-step illuminations processes are possible. For example, a hybrid two-step process involving both false pits and false lands can be implemented using a mask that has both one or more extra opaque portions and one or more extra transparent portions. Furthermore, a mask having one or more extra transparent portions can be used to create false pits by failing to illuminate those extra transparent portions of the mask during the mask-based step. The resulting false pits can then be selectively cured during the selective laser illumination step.

In general, two-step illumination processes, such as those represented in FIGS. 4 and 5, can be used to create DVDs identical to those manufactured using the techniques of either FIG. 2 or FIG. 3 using a mask, like mask 406 of FIG. 4 or mask 506 of FIG. 5, that does not, by itself, accurately represent the content of the resulting DVDs. If such a mask is stolen, then, without knowledge of the location of the false pits/lands, any unauthorized DVDs manufactured using the mask will contain inaccurate content. Depending on the number and location of the false pits/lands, the resulting DVDs may be rendered inoperative (e.g., unable to be played in a conventional DVD player), thereby effectively inhibiting unauthorized copying.

Two-step illumination processes also enable the manufacture of different instances of DVDs having content that differs in known ways, even when the different DVD instances are manufactured using the same optical mask, by selectively illuminating a different set of false pits/lands during the selective laser illumination step(s) for each different DVD instance. Such selective generation of (potentially unique) content for each DVD instance can be used to encode one or more of the following types of instance-specific information into each DVD:

Forensic tracking information such as time, date, and location of manufacture and intended seller and/or owner of DVD instance;

Serial number; and

Cryptographic information such as Digital Rights Management (DRM) keys/signatures.

The DVD manufacturing techniques of the present invention can be employed in a variety of different contexts, including mass production in a factory setting. Another possible manufacturing context is a relatively small DVD-manufacturing apparatus such as a kiosk that enables users (e.g., customers/store employees) to manufacture individual DVD instances locally (e.g., in the presence of the user).

Figure 6:
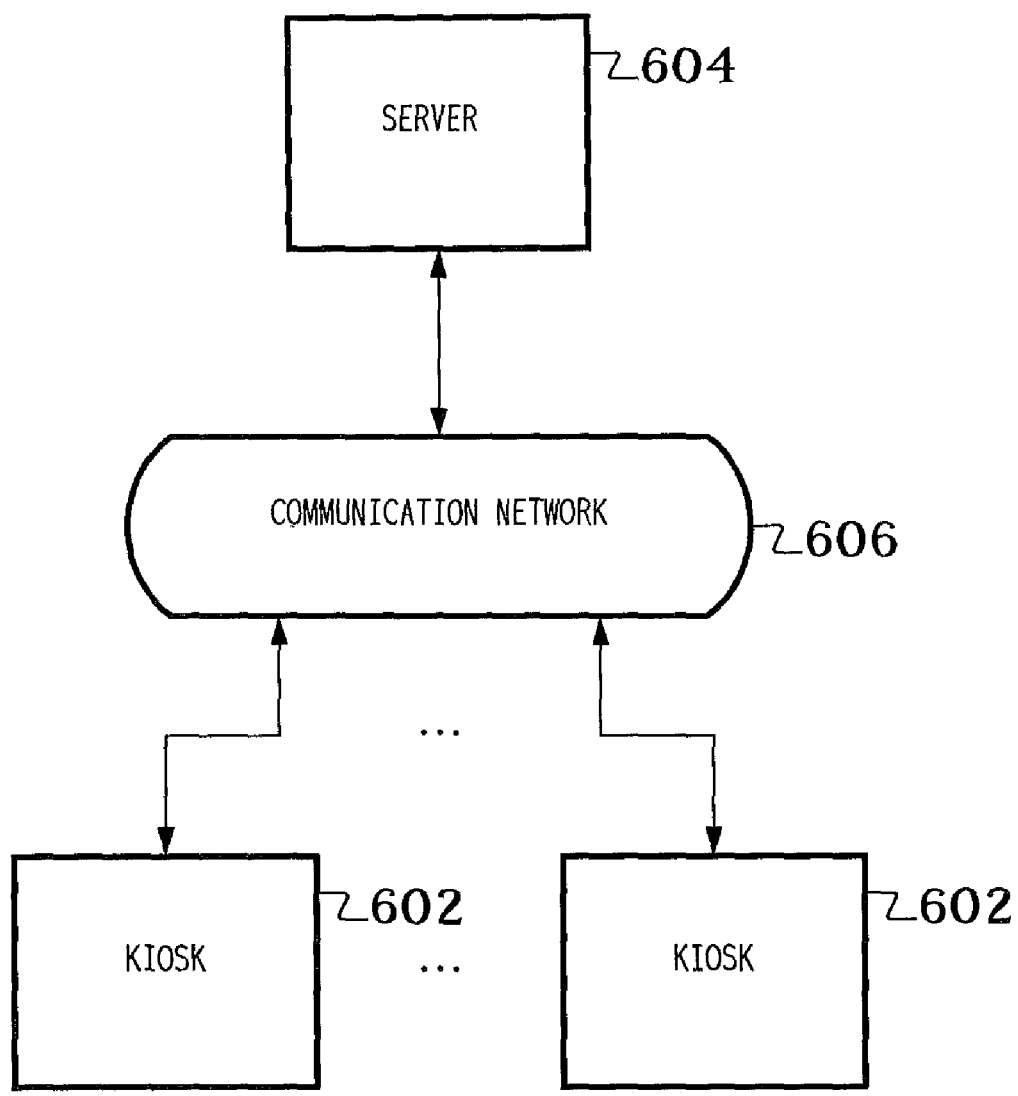
FIG. 6 shows a block diagram of a DVD manufacturing system, according to one embodiment of the present invention.

FIG. 6 shows a block diagram of a DVD manufacturing system 600, according to one embodiment of the present invention. DVD manufacturing system 600 includes one or more distributed kiosks 602 and a centralized server 604 that is able to communicate with the remotely located kiosks via a suitable communication network 606, which could, but does not have to, include the Internet.

Each kiosk 602 may contain one or more optical masks, each of which is an accurate mask, such as mask 206 of FIG. 2, or an inaccurate mask, such as mask 406 of FIG. 4 or inaccurate mask 506 of FIG. 5. In addition, each kiosk 602 contains suitable equipment for implementing manufacturing techniques according to one or more embodiments of the present invention, such as those represented in FIGS. 2-5.

Figure 7:
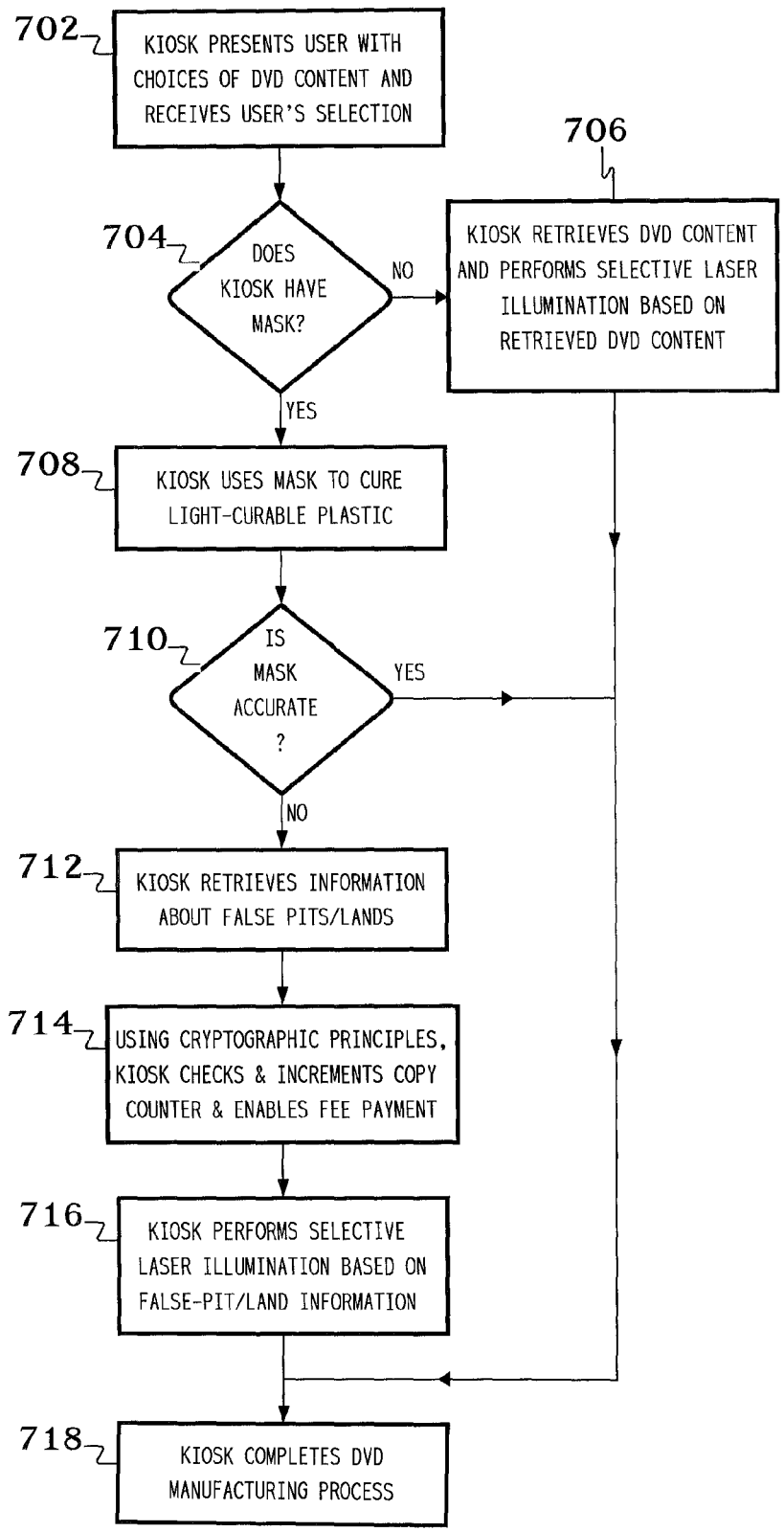
FIG. 7 shows a flow diagram of the processing implemented by the DVD manufacturing system of FIG. 6, according to one embodiment of the present invention.

FIG. 7 shows a flow diagram of the processing implemented by DVD manufacturing system 600 of FIG. 6 when a user uses a kiosk 602 to manufacture a single DVD instance, according to one embodiment of the present invention. The processing begins with the kiosk presenting the user with different choices of DVD content that are available (i.e., supported by that kiosk), and the kiosk receives the user's DVD content selection (step 702 of FIG. 7).

Using cryptographic principles, a copy count is checked and incremented and, if appropriate, a fee is paid (step 704).

If the kiosk does not have an optical mask corresponding to the user's DVD content selection (step 706), then, using cryptographic principles, the kiosk retrieves the content for the user's selection and performs selective laser illumination to cure corresponding portions of the light-curable material (e.g., corresponding to layer 204) (step 708). Depending on the particular implementation and/or the particular user selection, the kiosk may retrieve the DVD content either from its local memory resources or from the server via the communication network. Note that the kiosk's local memory resources may include an actual DVD instance corresponding to the user's selection. Processing then continues to step 718.

If the kiosk does have an optical mask corresponding to the user's DVD content selection (step 706), then the kiosk performs mask-based illumination to cure corresponding portions of the light-curable material (step 710).

If the mask contains an accurate representation of the final DVD content (step 712), then processing continues to step 718.

If the mask does not contain an accurate representation of the final DVD content (step 712), then the mask contains one or more "false-feature" portions, where each false-feature region is either a false-pit portion corresponding to a false pit or a false-land portion corresponding to a false land. In that case, using cryptographic principles, the kiosk retrieves information about the locations of those false pits and/or lands (step 714). As in step 708, depending on the particular implementation and/or the particular user selection, the kiosk may retrieve the false-pit/land information either from its local memory resources or from the server via the communication network.

Depending on the particular manufacturing technique being implemented, the kiosk then performs selective laser illumination either to cure false-pit regions in layer 204 (as in FIG. 4(C)) or to burn off false lands in layer 204 (as in FIG. 5(C)) (or both in a hybrid technique) (step 716). Processing continues to step 718.

In step 718, the kiosk performs the appropriate steps to complete the DVD manufacturing process to provide the user with a DVD instance that, depending on which subset of false pits/lands are illuminated in step 716, may contain a unique set of DVD content.

Note that the present invention can also be implemented in the context of stand-alone kiosks that do not rely on a centralized server, such as server 604 of FIG. 6.

Although the present invention has been described in the context of DVDs, it can also be implemented in the context of other types of data-storage media having pits and lands, such as CDs and even media corresponding to technology not yet developed or standardized.

One of the advantages of the present invention over the prior art is that data-storage media manufacturing techniques of the present invention can be implemented using equipment that is less expensive than the conventional machinery used to stamp DVDs, while enabling the manufacture of DVD instances whose content may conform to certain copyright protection schemes, such as the Contents Scramble System (CSS).

The present invention may be implemented using circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

I claim:

1. A method for manufacturing a data-storage medium having a final pattern of pits and lands, the method comprising:
   (a) applying a layer of a uncured, light-curable material to a substrate;
   (b) illuminating selected regions of the layer with material-curing light using an optical mask corresponding to an initial pattern of pits and lands different from the final pattern to cure portions of the material corresponding to the initial pattern of pits and lands;
   (c) illuminating, separate from the illumination of step (b), one or more selected regions to convert at least one of (i) a selected pit region into a land region and (ii) a selected land region into a pit region, wherein the selective illumination ensures that the completed data-storage medium, having the final pattern of pits of lands, is operable in a player apparatus;
   (d) removing uncured portions of the material from the substrate to create lands corresponding to the cured portions; and
   (e) completing the manufacturing of the data-storage medium having the final pattern of pits and lands.

2. The invention of claim 1, wherein:
   the optical mask contains at least one region corresponding to a false pit; and
   step (c) comprises selectively illuminating the false-pit region using laser light to cure the portion of the material corresponding to the false-pit region.

3. The invention of claim 2, wherein:
   the optical mask contains at least one region corresponding to a false land; and
   step (d) further comprises selectively illuminating the false-land region using laser light to remove the portion of cured material corresponding to the false-land region.

4. The invention of claim 1, wherein:
   the optical mask contains at least one region corresponding to a false land; and
   step (d) further comprises selectively illuminating the false-land region using laser light to remove the portion of cured material corresponding to the false-land region.

5. The invention of claim 1, wherein:
   step (e) comprises:
      (1) applying a reflective coating over the surface of a substrate containing the lands; and
      (2) applying a protective coating over the reflective coating; and
   the medium is a DVD or a CD.

6. The invention of claim 1, further comprising enabling a user to select content for the data-storage medium, wherein the data-storage medium is manufactured based on the user-selected content.

* * * * *